United States Patent Office 2,870,323
Patented Jan. 20, 1959

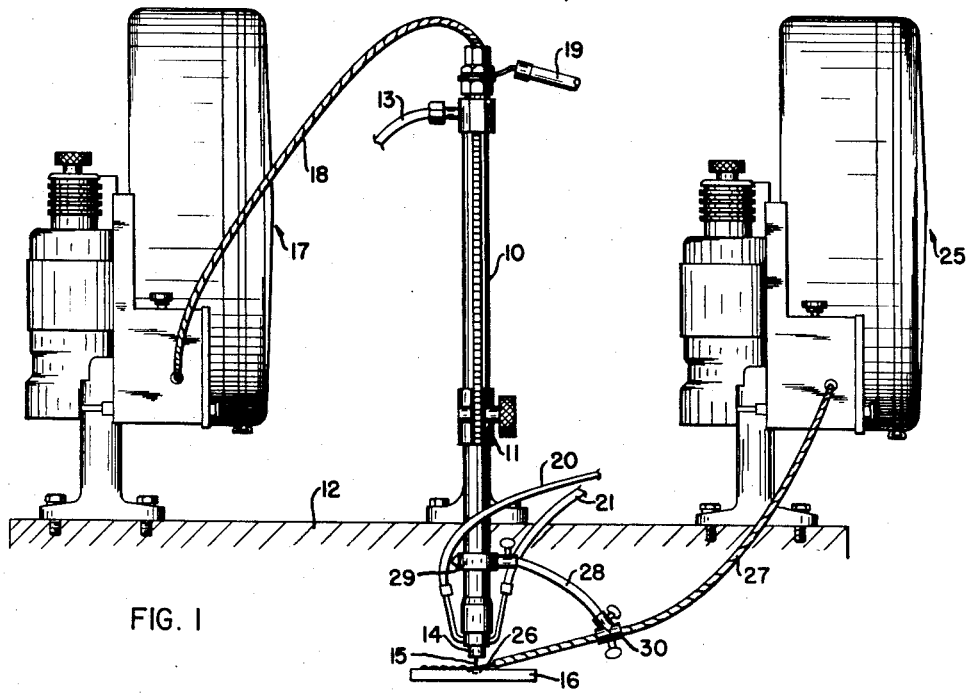
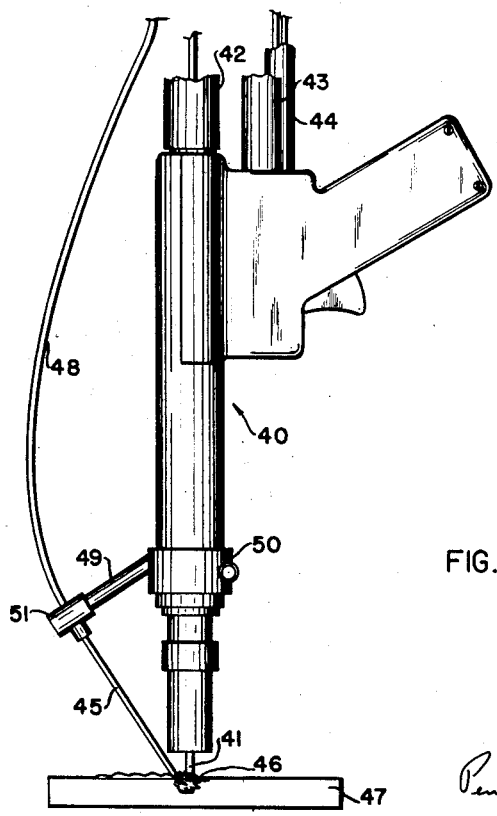

2,870,323

ARC WELDING

Edward H. Roper, Riverside, Conn., and Cornelius J. Sullivan, Somerville, N. J., assignors to Air Reduction Company, Incorporated, New York, N. Y., a corporation of New York Application June 15, 1954, Serial No. 436,858

9 Claims. (Cl. 219—137)

This invention relates to a flux-free deposition of metals and metal alloys upon workpieces for the purpose of forming welds, overlays or the like of desired alloy composition. It is particularly concerned with a gas shielded metal arc method of depositing metals and metal alloys to form the desired welds, overlays or the like. More particularly the invention is concerned with a gas shielded metal arc method for depositing welds, overlays or the like of a composition heretofore either not depositable by such a method or only depositable with great difficulties.

The advantages of gas shielded metal arc welding over the submerged arc process are now well known. One of the primary advantages is that by employing such welding, vertical and overhead welds may now be made. Also welds in relatively inaccessible places may now be made more readily and satisfactorily than has heretofore been possible. As is also well known, in gas shielded metal arc welding the arc is formed between the tip of a consumable electrode and the workpiece, the electrode being continually fed to the arc and the metal thereof transferred thereacross to the workpiece. For greatest efficiency of operation an electrode is made in the form of a wire which is continuously and automatically supplied from a coil thereof to the electrode holder. While the wire may be readily made of numerous metals and metal alloys and hence the metal deposited by the process also be of varied alloy compositions, where it is desired to deposit certain alloys and it would be desirable to effect their deposit from a consumable electrode, the nature of the alloy from which the electrode wire would have to be drawn is such that it may only be drawn with difficulty, and when drawn is so stiff as not to be coilable or readily feedable to the holder.

The obvious solution to this problem would of course be to make a composite electrode such as that disclosed in Robinson Patent 2,612,581 or one of a similar type but of different individual metals or alloys. Here, however, some difficulty is encountered. For example, certain metals and alloys, which while easily drawable into wire form, cannot be transferred across an arc. Such metals are those having low boiling points which result in their being volatilized at arc temperatures.

One approach that has been taken to the problem of depositing metals or metal alloys to form welds or overlays of a particular alloy composition is set forth in Hopkins Patents 2,151,914 and 2,191,471. This approach employed use of the so-called submerged arc process with a portion of the metal forming the electrode and being transferred across the arc and the remainder of the metal passing through the arc from within the electrode or being fed into the arc separately from the electrode. Hopkins processes, however, are subject to the same disadvantages as are any submerged arc process, namely, the weld is not visible to the operator, the process may not be employed for vertical or overhead welding and the flux tends to contaminate the weld metal and to adhere to and freeze on the electrode or electrodes when a welding operation is terminated. When the latter occurs initiation of a subsequent welding operation is made difficult.

The process contemplated by this invention for depositing metals and metal alloys upon a workpiece for the purpose of forming welds, overlays or the like of desired alloy composition comprises employing as a consumable electrode a wire made up of one or more of the elements of the desired alloy composition, establishing an arc between an end of the electrode and the workpiece, shielding the arc with an inert gas such as argon or helium, feeding the electrode to the arc as it is consumed by transfer of the metal thereof across the arc, and feeding to an edge portion of the weld puddle formed on the workpiece one or more wires containing the remainder of the elements of the desired alloy composition of the weld or overlay. The amount of each element so fed to the weld puddle may be controlled by the sizes of the electrode and auxiliary wires and/or by the rates at which they are fed to the arc or weld puddle as the case may be.

The disposition of the alloying elements between the electrode and one or more auxiliary wires is controlled primarily by two factors. Hence the elements are so disposed that the electrode and auxiliary wire may be readily formed by drawing so that they may be fed by conventional feeding apparatus and from coiled supplies thereof. Furthermore when the desired alloy composition to be deposited is to contain a metal or metals of low boiling point which might be volatilized at arc temperatures and thereby lost, such elements should be contained in the auxiliary wire or wires. When thus fed to an edge portion of the weld puddle they are not subjected to the higher temperatures of the arc. Furthermore the feeding of the auxiliary wire or wires to the edge portion of the weld puddle tends, it is believed, by reason of its relative coldness, to chill or congeal that portion of the puddle whereby the added metal will be retained therein. This is important in making welds, overlays and the like, in positions other than the so called flat or horizontal position.

For a more detailed understanding of the process of the invention and an apparatus by which it may be carried out, reference may be held to the following specific description and the accompanying drawing in which:

Fig. 1 is an elevation of an automatic form of apparatus; and

Fig. 2 is an elevation of a portion of a semi-automatic form of apparatus.

In Fig. 1 there is illustrated a conventional automatic gas shielded metal arc welding apparatus modified for use in carrying out the process of this invention. The apparatus comprises a conventional adjustably mounted electrode holder 10 supported by a bracket 11 from a fixed base 12. Shielding gas may be supplied through a conduit 13 to the electrode holder for discharge therefrom through a nozzle 14 to surround a consumable electrode 15 and an arc formed between the electrode and a workpiece 16. The electrode 15 is fed to the electrode holder 10 from a conventional supply and feed unit 17 to a flexible cable 18. The supply and feed unit 17 for the consumable electrode may, for example, be one similar to that disclosed in application Serial No. 182,488 filed August 31, 1950. One side of a source of welding current is connected to the electrode holder by an insulated cable 19, the other side of the source being connected to the workpiece by a second insulated cable not shown. The electrode holder may further be cooled by means of a cooling fluid supplied thereto through a conduit 20, the return flow being through a comparable conduit 21. According to this embodiment of the invention, a second wire supply and feed unit 25 is provided to feed an auxiliary wire 26 to the weld puddle through a flexible conduit 27. The end of the flexible conduit adjacent the electrode holder is supported by a bracket 28 secured to the electrode holder by a collar 29 and to the conduit 27 by a collar 30. The bracket 28 and the discharge end of the flexible conduit 27 are so positioned that the auxiliary wire will be fed into the weld puddle.

In Fig. 2 there is illustrated a semi-automatic form of apparatus by which the process of the invention may be carried out. It comprises a manual electrode holder 40 of a type well known and illustrated and described, for example, in Patent No. 2,659,796. A consumable electrode 41 is fed to and through the electrode holder 40 by a conventional supply and feed unit, not shown, but similar, if desirable, to either of those illustrated in Fig. 1. The electrode is fed to the electrode holder through a flexible conduit 42. Shielding gas may be supplied through a flexible conduit 43 while welding current may be supplied through an insulated cable 44. An auxiliary wire 45 is adapted to be fed to a weld puddle 46, formed on a workpiece 47 by an arc formed between the electrode 41 and the workpiece, through a flexible cable 48 supported adjacent the arc end of the electrode holder by a bracket 49 which is secured by a collar 50 to the electrode holder and a collar 51 to the flexible conduit. A supply and feed unit for the auxiliary wire which may be of a type similar to that illustrated in Fig. 1 may be employed.

With this semi-automatic apparatus by which it is contemplated particularly that welds, overlays or the like be made in positions other than the flat or horizontal position, it is important that the filler wire 45 be so directed that it enters the weld puddle at an edge portion thereof. In this way the amount of highly molten metal in the weld puddle is kept to a minimum and hence difficulty in maintaining the highly molten metal in the weld puddle is minimized. This is of course due to the chilling effect of the filler wire upon the molten metal of the weld puddle. In this manner also the difficulty which might be otherwise encountered in non-horizontal welding in making sure that the metal of the filler wire is properly transferred to the weld puddle is obviated. Dispersion of the metal from the filler wire through the weld puddle is, however apparently not retarded.

As will be pointed out hereinafter, relative rates of feed of the electrodes and the auxiliary wire may be the same or different. By varying the relative rates of feed, the alloy of the metal deposition may be varied, while the compositions of the electrode and auxiliary wire remain the same. In the alternative, if predetermined relative rates of feed must be maintained, the alloy of the metal deposition may be varied by varying the compositions of the electrode and auxiliary wire or by varying their sizes. Normally, however, the relative feed rates may be varied, and hence choice of both the compositions and the sizes of the electrode and auxiliary wire for a given metal deposition may be predetermined.

For depositing metals and metal alloys to form welds, overlays or the like of desired alloy composition by use of the above described apparatus, the elements of the desired alloy deposition may be divided between the electrode and the filler wire. In passing, it should be noted that either of the above specifically described apparatus might be provided with means for feeding a second, third or more filler wires to the weld puddle. In choosing the elements that are to be incorporated in the electrode and transferred through the arc to the weld puddle, certain considerations should be kept in mind, namely, the elements should be ones which, when alloyed, can be readily drawn to wire form having the flexibility characteristics desirable in a consumable electrode that is to be automatically fed to the arc in a conventional manner, they should further include no element of sufficiently low boiling temperature to be volatilized by the temperature of the arc, and they should be those which in alloyed and drawn wire form possess the electrical characteristics of a good consumable electrode. The remaining elements of the desired alloy deposition will be incorporated in the one or more auxiliary wires employed. The auxiliary wire may take any of a number of forms. Hence it may be a clad composite, the core of which is one element or an alloy of elements and the sheath another element or alloy of elements; or it may be a composite wire formed by twisting a number of individual wires together. Whatever its form, however, it should be sufficiently flexible so that it may be readily coiled and readily fed from coiled form by a conventional feeding means through a flexible conduit to the weld puddle.

Where it is desired to lay down an overlay substantially free of any base metal the current and voltage may be so regulated as to cause shallow weld penetration and thus negligible dilution of the weld metal by the base metal. However, where it is advantageous to cause considerable dilution of the weld metal with the base metal the current and voltage may be so regulated as to cause deep weld penetration, and thus increased dilution of the weld metal. The latter case is particularly important where brass deposits of increased hardness are desired. For example, the dilution of a brass deposit with iron or steel from a workpiece would increase the hardness of the weld considerably.

Certain specific examples of metal alloys which it may be desired to deposit as welds, overlays or the like, but which cannot be readily employed, for one or more of the reasons pointed out above, in the form of a single alloy drawn into a consumable electrode wire will now be mentioned.

For example, an alloy comprising 29% chromium, 9% nickel and 62% iron, which in itself would be difficult to draw into wire, may be deposited successfully by employing an electrode comprising 25% chromium, 20% nickel and 55% iron and an auxiliary wire comprising 28% chromium and 72% iron. The specific electrode and the specific auxiliary wire may be readily drawn.

Another example of an alloy that may be readily deposited in accordance with the process of this invention but which could not satisfactorily be deposited from an electrode alone is brass. While there is no difficulty in drawing a wire of brass for use as an electrode, the high percentage of zinc contained therein would be very difficult to transfer across an arc because of its low boiling point and a consequent volatilization thereof in the arc where the temperatures are relatively high. According to the process of this invention, the brass may be deposited by making use of an electrode substantially of deoxidized pure copper and an auxiliary wire substantially of pure zinc or, if desired of a composition of zinc, tin, lead, iron, copper or manganese and/or any combinations thereof. As the object in this example is to avoid volatilization of the zinc, it is particularly important that the auxiliary wire be fed into the weld puddle at a region of relatively low temperature and preferably outside of the limits of the arc itself. In this way the heat of the weld puddle is used to melt the zinc and the zinc in turn helps to produce the fluidity of the weld puddle. As previously indicated, this reduction of the fluidity of the weld puddle is of substantial significance when welding in positions other than the flat or horizontal positions.

As a specific example of the above, brass depositions have been successfully made by employing a deoxidized, substantially pure copper electrode and an auxiliary wire comprising from 90% to 95% copper and from 10% to 5% zinc. In these instances the electrode has been $\frac{1}{16}$ inch in diameter.

Another example of an alloy which it would be difficult to deposit directly from a consumable electrode across the arc is a lead-bronze alloy. In this instance an electrode composed of copper and tin might be employed, while an auxiliary wire made up substantially of lead is fed to the weld puddle at an edge portion thereof, preferably outside the arc. Or as a specific example of depositing such an alloy, we have found that a satisfactory weld deposit made up of from 5% to 6% lead, 2% to 3% tin and the balance of copper may be laid down by employing a deoxidized, substantially pure copper electrode 1/16 inch in diameter and a lead-bronze auxiliary wire 5/64 inch in diameter and comprising from 14% to 18% lead, 5% to 7% tin and the balance copper.

The above examples are by no means all of those alloys, difficulty with which would be encountered if an attempt were made to form electrodes thereof for use in conventional gas shielded metal arc welding. However, they do involve alloys the use of which is widely desired but the depositions of which have heretofore presented problems not readily overcome.

Various changes and modifications may of course be made in the embodiments of the invention disclosed without departing from the scope of the invention which of course should be limited only to the extent set forth in the appended claims.

We claim:

1. A method of depositing metals and metal alloys on a workpiece to form a weld, overlay or the like of desired alloy composition which comprises establishing an arc between the workpiece and a consumable wire electrode to form a puddle of molten metal on said workpiece, said electrode wire being of a readily drawable composition composed of at least one of the elements making up the desired alloy composition but substantially free of any such element which will volatilize at the temperature of the arc, continuously feeding said electrode wire into the arc, supplying an inert gas to surround the arc to shield it, the weld puddle and the adjacent portions of the workpiece from the ambient atmosphere, and continuously feeding an auxiliary wire to said weld puddle, said auxiliary wire being of a readily drawable composition composed of at least one element selected from the elements making up the desired alloy composition.

2. A method according to claim 1 in which the auxiliary wire is fed to an edge portion of the weld puddle outside of the arc.

3. A method according to claim 2 in which all of the elements which it is necessary to add to the weld puddle in order to obtain a deposition of the desired alloy composition are contained in the electrode and the auxiliary wire.

4. A method according to claim 1 in which the electrode is made substantially of pure copper and in which the auxiliary wire is made substantially of pure zinc.

5. A method of depositing metals and metal alloys on a workpiece to form a weld, overlay or the like of desired alloy composition which consists essentially of establishing an arc between the workpiece and a consumable wire electrode to form a puddle of molten metal on said workpiece, said electrode wire being of a readily drawable composition composed of at least one of the elements making up the desired alloy composition but substantially free of any such element which will volatilize at the temperature of the arc, continuously feeding said electrode wire into the arc, supplying an inert gas to surround the arc to shield it, the weld puddle and the adjacent portions of the workpiece from the ambient atmosphere, and continuously feeding at least one auxiliary wire to an edge portion of the weld puddle outside of the arc, each said auxiliary wire employed being of a readily drawable composition composed of at least one element selected from the elements making up the desired alloy composition, and all of the elements which it is necessary to add to the weld puddle in order to obtain a deposition of the desired alloy composition being contained in the electrode and any auxiliary wires employed.

6. A method of depositing metals and metal alloys on a workpiece to form a weld, overlay or the like of desired alloy composition which consists essentially of establishing an arc between the workpiece and a consumable wire electrode to form a puddle of molten metal on said workpiece, said electrode wire being of a readily drawable composition composed of at least one of the elements making up the desired alloy composition but substantially free of any such element which will volatilize at the temperature of the arc, continuously feeding said electrode wire into the arc, supplying an inert gas to surround the arc to shield it, the weld puddle and the adjacent portions of the workpiece from the ambient atmosphere, continuously feeding at least one auxiliary wire to an edge portion of the weld puddle outside of the arc, each said auxiliary wire employed being of a readily drawable composition composed of at least one element selected from the elements making up the desired alloy composition, and all of the elements which it is necessary to add to the weld puddle in order to obtain a deposition of the desired alloy composition being contained in the electrode and any auxiliary wires employed, and varying the rates of feed of said electrode and each said auxiliary wire employed in accordance with their sizes and compositions to obtain a deposition of metal of the desired alloy composition.

7. A method according to claim 1 in which the electrode is made of substantially pure copper and in which the auxiliary wire is made of an alloy comprising from 90% to 95% copper and from 10% to 5% zinc.

8. A method according to claim 1 in which the electrode is made of deoxidized substantially pure copper and in which the auxiliary wire is made of an alloy comprising from 14% to 18% lead, 5% to 7% tin and the balance copper.

9. A consumable electrode method of depositing metals and metal alloys on a workpiece to form a weld, overlay or the like of a desired alloy composition which includes an element volatilizable at the temperature of the arc, which method comprises establishing an arc between the workpiece and a consumable wire electrode to form a puddle of molten metal on said workpiece, said electrode wire being of a readily drawable composition composed of at least one of the elements making up the desired alloy composition but substantially free of any such element which will volatilize at the temperature of the arc, continuously feeding said electrode wire into the arc, supplying an inert gas to surround the arc to shield it, the weld puddle and the adjacent portions of the workpiece from the ambient atmosphere, and continuously feeding an auxiliary wire to said weld puddle, said auxiliary wire being of a readily drawable composition composed of at least one element selected from the elements making up the desired alloy composition and containing the aforesaid element which is volatilizable at the temperature of the arc.

References Cited in the file of this patent

UNITED STATES PATENTS

| | | |
|---|---|---|
| 2,113,667 | Swift | Apr. 12, 1938 |
| 2,151,914 | Hopkins | Mar. 28, 1939 |
| 2,151,915 | Hopkins | Mar. 28, 1939 |
| 2,319,977 | Cape et al. | May 25, 1943 |
| 2,320,327 | Meduna | May 25, 1943 |
| 2,370,467 | Hopkins | Feb. 27, 1945 |
| 2,525,133 | Hopkins | Oct. 10, 1950 |
| 2,681,401 | Anderson | June 15, 1954 |
| 2,681,970 | Koopman | June 22, 1954 |
| 2,731,536 | Laur | Jan. 17, 1956 |